(No Model.)
J. H. FORSHAY.
Refrigerator.
No. 238,776. Patented March 15, 1881.
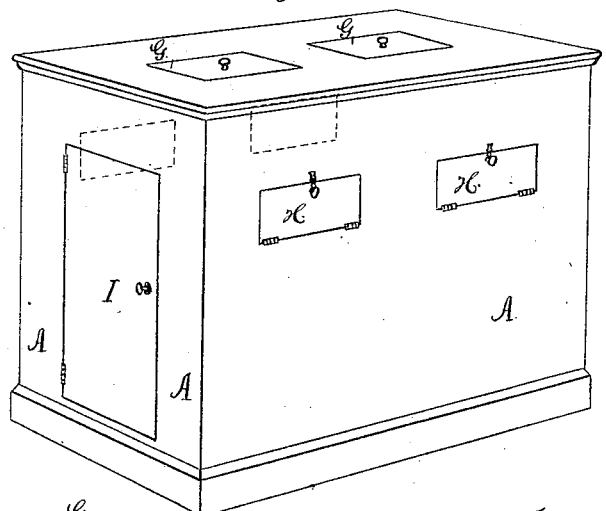
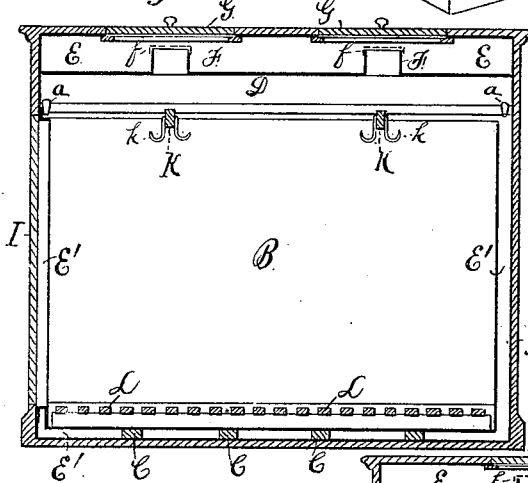
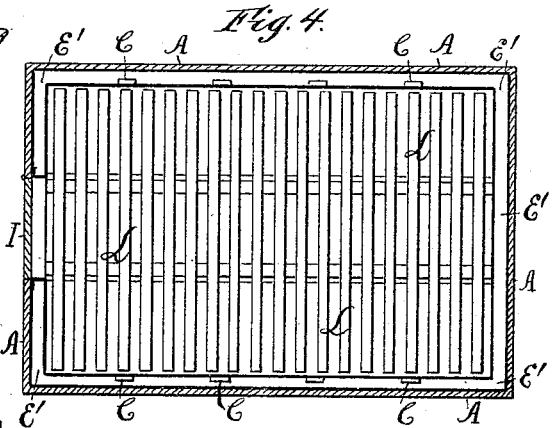
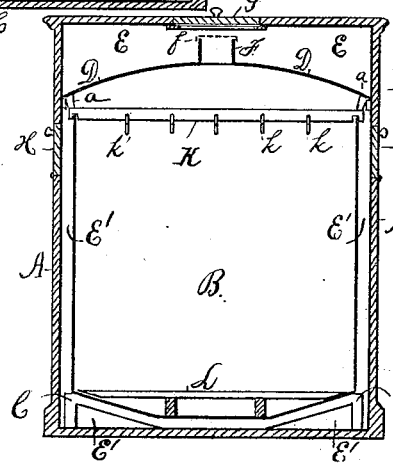
Attest:
Charles K. Searle
J. S. Acker, Jr.
J. H. Forshay,
Inventor:
By Worth Osgood
Attorney.

UNITED STATES PATENT OFFICE.

JACOB H. FORSHAY, OF NEW YORK, N. Y.

REFRIGERATOR.

SPECIFICATION forming part of Letters Patent No. 238,776, dated March 15, 1881.

Application filed January 29, 1881. (No model.)

*To all whom it may concern:*

Be it known that I, JACOB H. FORSHAY, of New York city, county of New York, and State of New York, have invented certain new and useful Improvements in Refrigerators, of which the following is a full, clear, and exact description, reference being had to the accompanying drawings, and to the letters of reference marked thereon.
My invention has special relation to that class of refrigerators or ice-boxes which are employed for storage and transportation of meats and fruits or vegetables in considerable quantities, and generally made of large size; but for all purposes of the invention the principles thereof and the constructions hereinafter indicated may be employed to good advantage in the smaller-sized refrigerators, such as are used for domestic purposes.
The object of my invention is to produce an ice-box or refrigerator wherein the air in the provision-chamber may be kept dry and pure, and wherein not only a very low but a continuous and uniform temperature may be maintained for a long time under an economical consumption of ice.

To this end my invention involves certain novel and useful principles of operation, assemblages, combinations, or arrangements of parts and details of construction, all of which will be hereinafter first fully described, and then pointed out in the claims.

In the drawings, Figure 1 is a perspective view of the interior of a refrigerator or ice-box constructed in accordance with my invention. Fig. 2 is a longitudinal section; Fig. 3, a cross-section, and Fig. 4 a horizontal section and partial plan, all indicating the construction and arrangement selected as best adapted to illustrate my improvements.

In all these figures like letters of reference, wherever they occur, indicate corresponding parts.

The outer vertical walls, A A, of the refrigerator are made in any desired form or size, and after the manner usually adopted in such constructions for forming non-conducting walls. The inner faces of these walls are lined with any suitable metal or other substance (preferably galvanized iron) to render them water-tight. The bottom of the chamber formed by these walls is likewise lined, and so also the top, if desired, the whole forming an air-tight and water-tight casing. Within the chamber thus formed is located the provision-box B for containing the materials to be kept cool. This is preferably made of boiler-iron sufficiently strong and durable and rendered water-tight. It may well be galvanized, if desired. It is left entirely open at the top, and when very heavy may rest upon suitable saddles, as at C C, placed upon the bottom of the exterior casing or chamber, or it may be otherwise supported above said bottom, in all cases leaving a space for water, or water and ice, below it. This space has a free communication with the spaces between the sides and ends of boxes A and B, so that the provision-chamber is entirely surrounded by an ice-chamber. The upper edges of box B are considerably lower than the top of the outer casing or jacket, and over the box is the roof or partition D, extending all around the interior and forming a tight joint with the inner linings of walls A. Between this roof D and the top of the exterior casing is the upper ice-chamber, E, made sufficiently large to contain the required supply of ice. A suitable number of drip-openings, as at *a a*, are provided in the roof D to allow the drip from the ice in chamber E to pass down to the lower ice-chamber, E', or the space between the bottoms and walls of the provision-chamber and the exterior casing. Two or more chimneys or ventilating-pipes, F F, extend from openings in the roof D over the open upper part of the provision-chamber up nearly to the level of the under side of the top of the casing.

When charging the upper ice-chamber, E, the caps *f f* are placed over the chimneys or ventilating-tubes to prevent admission of ice, to exclude the exterior atmosphere, and to confine the cold air already in the section below the roof, thus economizing the low degree of temperature which may have been produced. For convenience in charging this upper ice-chamber any suitable number of doors or lids, G G, may be provided in the top, and for charging the lower ice-chamber doors or lids H H (any number) are provided in the walls A A, the tops of these doors being, of course, below the roof D.

When an extremely low degree of temperature is required, ice, or ice with a proper proportion of salt, is packed in chamber E' as high as may be desired and the doors communicating with said chamber securely closed. Ice, or ice with a proper proportion of salt, is also packed in the upper ice-chamber, E, on the roof D, and the lids G securely closed, like those in the walls A, against the admission of air, the caps *f* being first removed from over the ends of the ventilating pipes or chimneys. The drip from the upper ice-chamber enters the lower ice-chamber, which envelops the sides, ends, and bottom of the provision-box, and is there retained, (not being allowed to flow away,) and the low degree of temperature in this drip is maintained for a considerable time, there being no communication between it and the surrounding atmosphere, in which the refrigerator stands. The air within the provision-box having free access to or communication within the water in the surrounding ice-chamber through the opening between the roof D and the upper edges of the box B, the moisture in the air will be taken up or absorbed by the cold water, and the impure gases which may arise from the materials in the provision-chamber will be likewise absorbed, so that the air is maintained in a dry, pure, and cold state, best adapted for the preservation of meats and fruits or vegetables or other perishable articles.

By retaining the drip from the ice within the refrigerator and out of contact with the exterior air, I am enabled to utilize the low degree of temperature therein for keeping the provision-chamber cold, even after the ice has been entirely melted. Thus I am enabled not only to prevent the too rapid melting of the ice but to insure a long-continued low temperature without the necessity of recharging, as well as to insure a uniform temperature, and one practically under the control of the operator, who, with a little practice, can gage his charging to correspond with the degree of cold desired. For instance, ice and salt may be packed in both ice-chambers, or ice in one and ice and salt in the other, or ice alone in both, or ice and salt in one and no packing the other. So, also, the quantities of packing may be varied, and by varying the quantities and qualities as experience will dictate any desired degree of temperature may be obtained and retained at pleasure.

When the door I is opened for placing of meats, &c., in B, of course a certain quantity of air from the exterior is admitted. This warmer air naturally rises and immediately finds its way through one of the ventilating pipes or chimneys F into the upper ice-chamber, above the ice therein. Passing over the ice, the moisture in the air is condensed, the impure gases are absorbed, and upon reaching the opposite pipe or pipes, being then rendered colder and heavier, the air descends and re-enters the provision-chamber. So long as any heat or gases arise from the materials in the provision-chamber this circulation is maintained, and the contents of the chamber thus kept pure, cold, and sweet. Meats frozen in this chamber are found to retain their natural juices after being returned to the temperature of the air, the same as if they had not been so preserved, and this I attribute to the pure and dry atmosphere which I am enabled to maintain in the box in consequence of the peculiar ventilation into the upper ice-chamber and over the ice therein, the exclusion of the surrounding atmosphere, the enveloping of the provision-box (at bottom, top, sides, and ends) by ice or ice and water chambers, the retention of the drip, and the provision for free communication of the air in the box with the water in the lower ice-chamber.

Fruits and vegetables do not require so low a temperature as meats, and for these the packing should be regulated according to their kinds and qualities.

For railroad transportation the refrigerator constructed and operating as above explained has only to be built in or on a car, which may be wholly or only partially occupied by the improved device; and for water transportation the improved device may be constructed in a ship, as will be readily understood. For long trips or passages the improvements will be found specially advantageous, for under ordinary circumstances the ice-chambers will not need repacking, especially in large-sized vessels, &c., where the upper ice-chamber can readily be made to contain a supply of ice sufficient to last the entire trip. This results in economy of labor as well as of material—matters of special importance in the shipment of large quantities of meats, &c.

I preferably make the roof D slightly arched, as shown, the better to support the superposed weight of ice, and to secure certain and constant carrying down of the drip to the outlets over the spaces at the sides and ends of the provision-box. Of course in very large refrigerators the roof may be suitably trussed, and the sheeting may then be made as light as is consistent with its requisite durability. The walls of the provision-chamber B and the bottom thereof may be made double, if desired, or of more than one thickness of material; but if of one thickness it may be suitably braced or provided with any number of ribs. I prefer, however, to make it of one thickness and to run the cross-pieces of wood or iron, as at K, along on the tops of the opposite walls. These cross-pieces slide along freely and carry meat-hooks *k*, upon which materials may be suspended. Being provided with notches near their ends, the pieces K serve also to brace the side walls of the box B and prevent them from being sprung out of place. The material being suspended from the hooks, the pieces K, with their loads, can be moved together as closely as may be desired, and the box thus conveniently packed to its fullest extent.

On the bottom of box B, I provide an ordinary grated flooring, as L, the purposes of which are well understood.

To prevent water from rising too high in the lower ice-chamber any convenient form of overflow-pipe may be applied; but it should be such as to exclude the air. For cleaning out the lower ice-chamber or drawing the water therefrom a stop-cock may be located near the bottom line of the chamber and communicating with the exterior. Upon this a hose-pipe may be applied to convey the water to any required point. On board ship the hose-pipe may be used as a connection with a pump for drawing up the water.

When constructed and arranged to operate substantially in accordance with the foregoing explanations, the improved refrigerator or ice-box is found to admirably answer the several purposes and objects of the invention, as previously stated.

Having now fully described my invention, what I claim as new, and desire to secure by Letters Patent, is—

1. In an ice-box or refrigerator of the character herein specified, the provision-chamber, open at top beneath the roof or partition and surrounded on the sides and bottom by an ice-chamber which receives and holds the drip from the ice-chest above, the arrangement being substantially as described, so as to exclude the external atmosphere, for the purposes and objects named.

2. In an ice-box or refrigerator of the character herein specified, the provision-chamber, communicating with the drip and ice chamber surrounding the same through the open space between the roof and walls of the provision-chamber, and with the ice-chamber above the roof or partition through two or more ventilating pipes or chimneys, for the purpose of cooling and purifying the contents of said provision-chamber and for maintaining a circulation, substantially as shown and described.

3. In combination with the open-top provision-chamber, the surmounting roof or partition provided with two or more ventilating pipes or chimneys leading into the air-tight ice-chest, opening at or near the top thereof, and with drip-orifices communicating with the air-tight drip and ice chamber which surrrounds the provision-chamber, substantially as set forth.

4. The combination, as before set forth, of the water-tight provision-chamber, the surrounding air-tight drip and ice chamber, having an air-communication with the interior of said provision-chamber, the surmounting roof or partition, the ventilating pipes or chimneys, opening at or near the top of the upper ice-chest, and the drip-orifices, all located within the exterior casing, and (when closed) having no communication with the exterior atmosphere, substantially as shown and described.

5. In combination with the open-top provision-chamber, surmounted by an ice-chest and surrounded by the drip and ice chamber, the sliding cross-pieces for sustaining the materials and for bracing the side walls, said pieces being movable upon the upper edges of the walls of the provision-chamber in the open space between the walls and the roof or partition, substantially as shown and described.

6. The open-top provision-chamber having water-tight walls and bottom, the same being located in an ice-chamber which receives and holds the drip from an ice-chamber above, and being supported above the bottom of the exterior casing, so as to allow room for drip and ice underneath the provision-chamber, a free open space being left beneath the roof or partition and above the walls of the provision-chamber, substantially as shown and described.

In testimony that I claim the foregoing I have hereunto set my hand in the presence of two witnesses.

JACOB H. FORSHAY.

Witnesses:
F. W. HANAFORD,
WORTH OSGOOD.